(No Model.)
A. G. BORRY.
CHIMNEY.
No. 571,333. Patented Nov. 17, 1896.
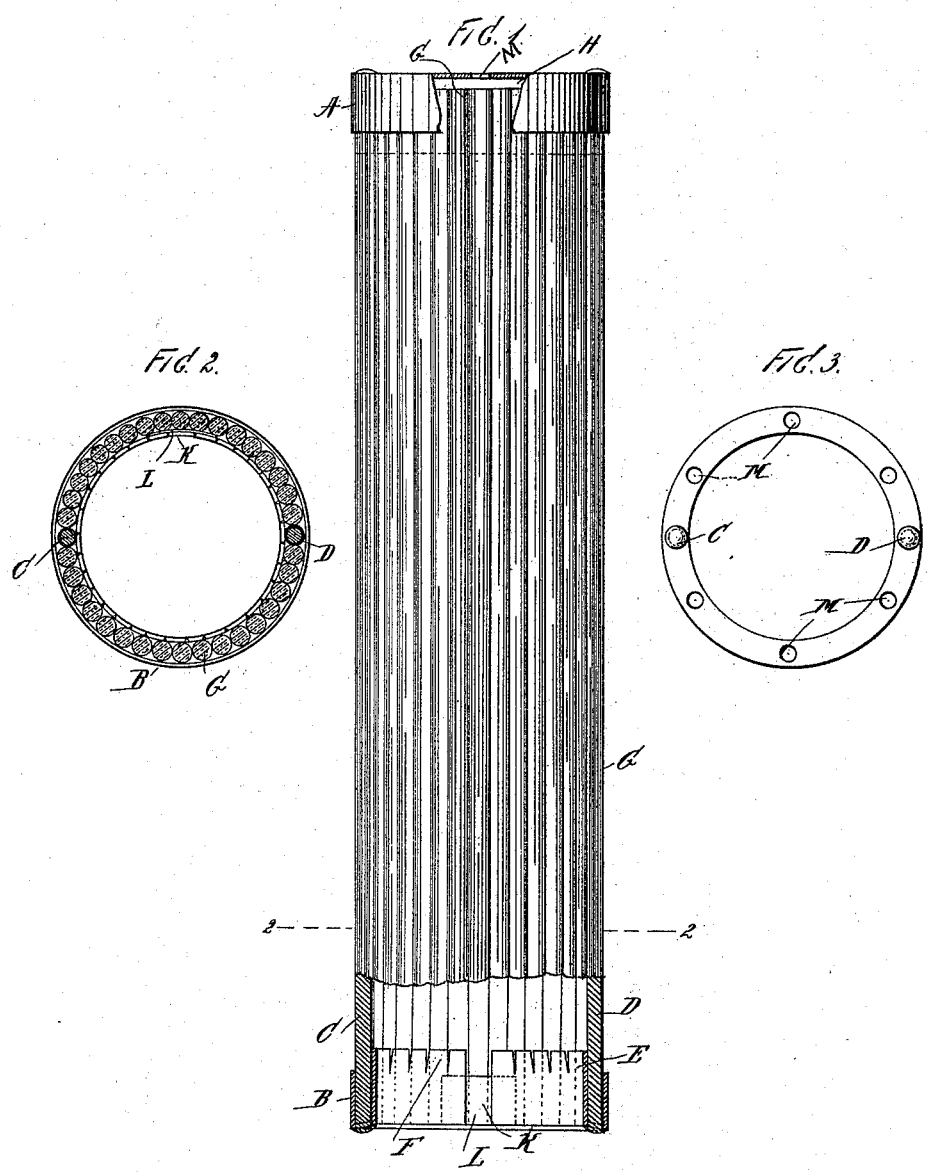
WITNESSES:
John Buckler,
L. M. Muller.
INVENTOR
Alexander G. Borry,
BY
Edgar Tate
ATTORNEYS

UNITED STATES PATENT OFFICE.

ALEXANDER G. BORRY, OF NEW YORK, N. Y.

CHIMNEY.

SPECIFICATION forming part of Letters Patent No. 571,333, dated November 17, 1896.

Application filed August 16, 1895. Serial No. 559,493. (No model.)

*To all whom it may concern:*

Be it known that I, ALEXANDER G. BORRY, a citizen of Germany, and a resident of New York, in the county of New York and State of New York, have invented certain new and useful Improvements in Chimneys, of which the following is a specification, reference being had to the accompanying drawings, forming a part thereof, in which similar letters of reference indicate corresponding parts.

This invention relates to chimneys for gas and other burners, and the object thereof is to produce an improved chimney for Argand burners, of either gas or oil, and especially such as are known to produce a high degree of light, such, for instance, as that class of Argand burners which mingle air with the gas and are provided with a hood or cone of refractory earths and are known as "incandescent" gas-burners.

The invention is fully disclosed in the following specification, of which the accompanying drawings form a part, in which—

Figure 1 is an elevation of my improved chimney, parts of the ends thereof being broken away so as to show the construction; Fig. 2, a section on the line 2 2 of Fig. 1, and Fig. 3 a plan view.

In the practice of my invention I provide a frame consisting of the annular heads or end pieces A and B, which are united by means of metal rods or bars C and D.

The annular heads A and B are similar in form and are each U-shaped in cross-section, as shown at the bottom of Fig. 1, and the inner wall thereof is extended, as shown at E, and the upper portion thereof is divided or slitted, as shown at F, any desired number of these divisions or slits by which the divisions are formed being provided. This inner flange is made deeper than the outer one and is slitted so that the strips made by the slitting may be of sufficient length and elasticity to be bent outwardly to assist in holding the glass rods in place.

The body portion of my improved chimney is composed of glass rods G, which are held in place and supported in a tubular form by means of the heads or ends A and B, the U-shaped space formed therein being entirely occupied by said glass rods in connection with the metal rods C and D, which constitute a part of the frame within which the glass rods are placed.

The glass rods G are placed loosely in the frame and are free to move therein, and are also slightly shorter than said frame, as shown at H in Fig. 1, so as to provide for the expansion and the contraction thereof.

The vertical spaces K are formed in the inner wall of the head B in order to provide means for the insertion of the glass rods, said vertical spaces being preferably formed on opposite sides of the head in order to provide means for inserting the glass rods on each side of the metal rods C and D, and these vertical spaces are closed by means of plates L, which make the inner wall of the head B continuous and hold the glass rods in place. These metal plates are removable, and, as will be observed, if one of the glass rods on either side of the chimney should be broken a new rod may easily be inserted to fill the place thereof.

My improved chimney may be of any desired length or diameter in cross-section, and it will thus be seen that I provide a chimney composed of glass rods which are removably held in a frame and which are capable of expansion and contraction, and in addition thereto I provide means for inserting new rods if any of the old ones should be broken.

With the usual form of chimney used in connection with the class of burners hereinbefore referred to the heat produced by said burners in a short time dims or colors the chimney or gives it a whitish or sanded appearance, which is very objectionable and which obstructs the proper diffusion of the light. It is also a well-known fact that in Argand burners of the class named the lighting of the same after the gas is turned on frequently and almost always causes a slight explosion, which is frequently fatal to the chimney. Each of the foregoing objections is obviated by the construction herein shown and described. My improved chimney being composed of separate movable glass rods, as shown, admits readily of the escape of the gases in the chimney at the time of the ignition of the light and which causes the explosion hereinbefore referred to, and even should such explosion take place the force thereof would pass off between the separate movable glass rods of which my improved chimney is composed, while at the same time this feature of the construction which enables the gas to pass off between the separate rods of the chimney, prevents the overheating and discoloration of the chimney referred to.

Another effect of my improvement is the complete and general diffusion of the light produced by the high-grade burners of the class mentioned, and especially those using refractory earths and known as "incandescent" gas-burners. The light produced by these burners is very injurious to the eyes under ordinary circumstances, but with the use of my improved chimney this objection is entirely avoided, the refractory power of the glass rods which compose the chimney acting to cause the general diffusion of the light and to prevent its concentration and the injurious effects produced thereby upon the eyes. I also form in the heads or ends, or that portion thereof by which the inner and the outer walls are united, perforations or openings M, as shown in Fig. 3, which provide means for the ventilation of said ends or heads and thus prevent the overheating thereof.

The divided or slitted portions F of the inner walls of the ends or heads may be bent inwardly to permit of the free insertion of the glass rods, and afterward, if desired, may be bent outwardly, so as to prevent the too free movement thereof; and it is evident that changes in and modifications of the construction described may be made without departing from the spirit of my invention or sacrificing its advantages, and I therefore reserve the right to make all such alterations therein as fairly come within the scope of the invention.

Having fully described my invention, I claim and desire to secure by Letters Patent—

1. A chimney for gas or other burners comprising a frame composed of annular heads or end pieces, and united by metal rods said heads or end pieces being U-shaped in cross-section, and the inner walls continued above the outer walls, and slitted or divided, and the space between the metal rods being filled with glass rods, which are removable, the inner wall of one of said heads or ends being provided with a vertical opening or space by means of which the glass rods may be inserted or removed, said space being closed by a movable plate, substantially as shown and described.

2. The combination in a chimney of the character described, of the annular rings or heads provided with annular flanges one of which is wider than the other and which are provided with one or more vertical slots through which the glass rods are inserted, said inner lower flange having a series of incisions or cuts upon the upper edge thereof, the metallic rods connecting said heads and the glass rods removably secured between said flanges, substantially as described.

In testimony that I claim the foregoing as my invention I have signed my name, in presence of the subscribing witnesses, this 7th day of August, 1895.

ALEXANDER G. BORRY.

Witnesses:
M. A. KNOWLES,
L. M. MULLER.